Jan. 25, 1944. H. A. FREEMAN 2,340,264
METHOD FOR CURING TIRES
Filed June 4, 1942 2 Sheets-Sheet 1

Inventor
Harold A. Freeman
By
Attorney

Jan. 25, 1944.                H. A. FREEMAN                2,340,264
                         METHOD FOR CURING TIRES
                          Filed June 4, 1942            2 Sheets-Sheet 2

Inventor
Harold A. Freeman
By
Attorney

Patented Jan. 25, 1944

2,340,264

UNITED STATES PATENT OFFICE 2,340,264

METHOD FOR CURING TIRES

Harold A. Freeman, Akron, Ohio, assignor to Wingfoot Corporation, Akron, Ohio, a corporation of Delaware Application June 4, 1942, Serial No. 445,707

14 Claims. (Cl. 18—53)

This invention relates to the art of vulcanizing or curing tires, and it refers more particularly to certain improved methods for curing or vulcanizing pneumatic vehicle tires.

Heretofore tires have been cured by application of heat and pressure while the tires have been confined within molds, such operations having been carried out both in pot heaters (accommodating a multiplicity of tires), and in individual vulcanizing presses (accommodating only one or two tires). In most cases tires within the confining molds have been inflated through the medium of appropriate fluid pressure supplied in the form of compressed air, hot water, steam or various combinations of these media, and the most usual practice has been to introduce these inflating media into curing bags or airbags placed within the tires. In recent years the trend of the industry has been away from pot heaters and toward more universal adoption of the individual vulcanizers or presses. Such trend, however, has given rise to one objection centering around high equipment cost. For this reason it has been desirable to find ways of reducing the press time of cures and thus increasing the working capacities of these individual vulcanizers.

The present invention in its broad aspect accomplishes this purpose and thus reduces curing costs. In addition to reducing costs, however, the invention is important in the present National Emergency inasmuch as it makes possible increased production by tire manufacturers with the individual vulcanizing equipment already at hand. More specifically, the invention contemplates that the tires shall be only partly cured within the individual vulcanizers, and thereafter the cure is completed outside of the individual vulcanizers and with relatively inexpensive equipment. The preliminary cure or partial cure of the tires within the confining molds is carried to a degree just beyond the blow point or blowing point of the rubber compounds used in the tires, and the cures are completed without addition of any more heat in what may be likened to a fireless cooker.

The foregoing and other features and objects of the invention will readily appear from the following description when taken in connection with the accompanying drawings wherein one form of the invention is shown merely by way of illustration, and wherein.

Figure 1:
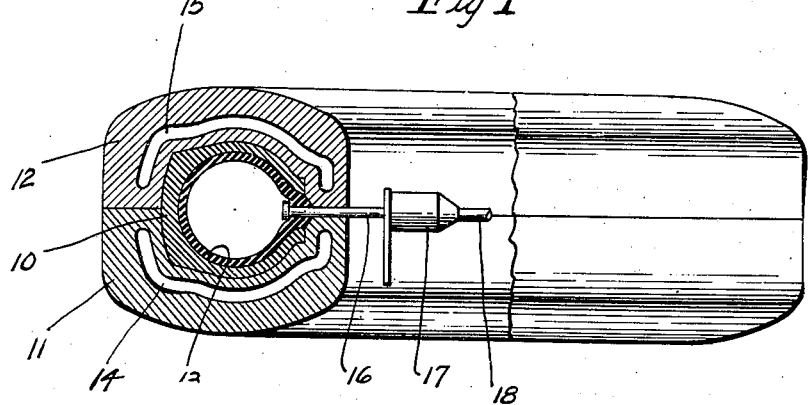
Fig. 1 is a side elevation partly broken away and partly in section showing an individual vulcanizer with a tire and airbag in place for the first stage of cure.

Referring in detail to the accompanying drawings it will be seen that the tire 10 is first placed and confined within a pair of mold sections 11 and 12 and is expanded and pressed therein through the medium of a curing bag or airbag 13. The mold sections 11 and 12 may be of any ordinary or preferred form and are shown as provided with steam jackets 14 and 15 for the application of heat to the exterior of the tire 10. Of course, the molds need not be steam jacketed if they are used in or with a platen press or in a pot heater. Similarly the airbag 13 may be of any usual or desired form and provided with an inflation stem 16 for quick detachable connection of a coupling 17 on a fluid pressure supply line 18. While the tire 10 is thus confined within the mold or between the mold sections 11 and 12 the airbag 13 may be expanded or inflated by either compressed air or hot water or steam or any combination of such media as is well-known in the art of vulcanization. One such practical curing process is completely disclosed and claimed in my Patent No. 2,066,265 granted December 29, 1936, to which reference may be had for details of the first stage of the present curing method.

Figure 2:
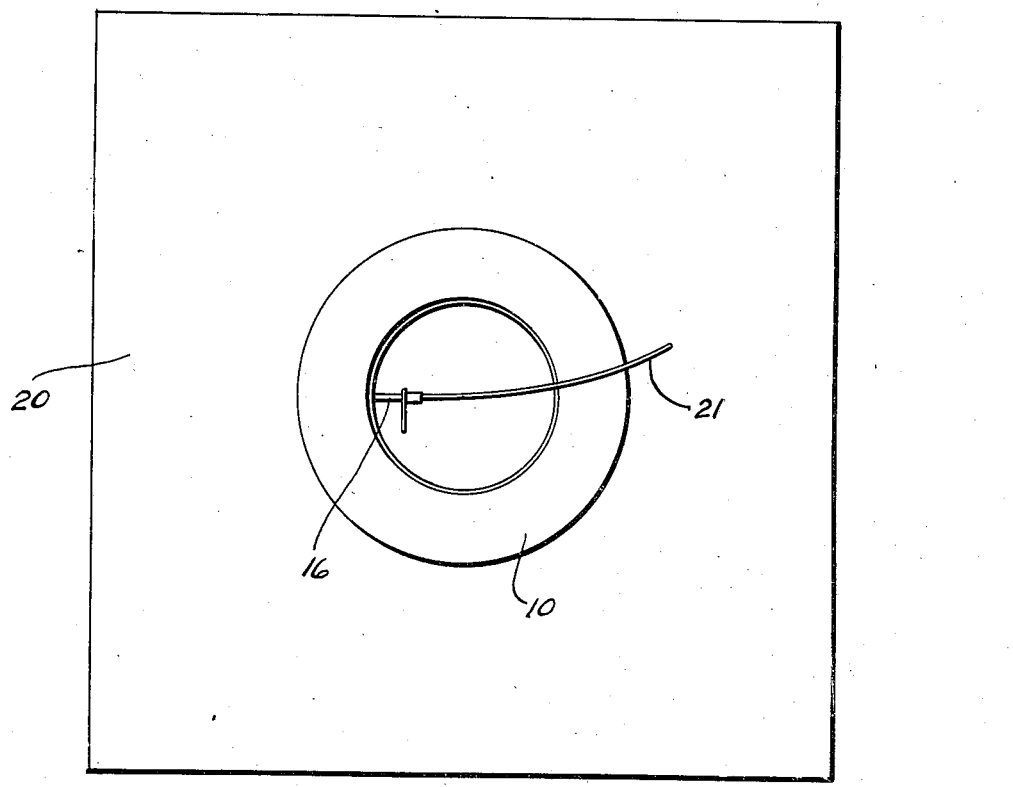
Fig. 2 is a top plan view of the partly cured tire resting upon a curing blanket in accordance with the invention.
Figure 3:
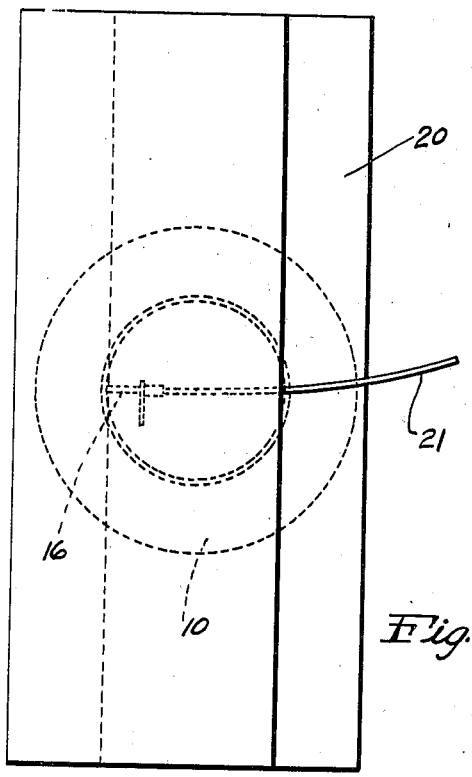
Fig. 3 is a view similar to Fig. 2 but showing the blanket partly wrapped about the tire.
Figure 4:
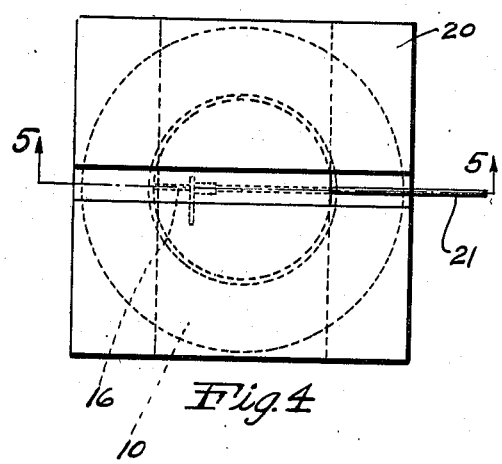
Fig. 4 is another similar view showing the blanket entirely wrapped about the tire.
Figure 5:
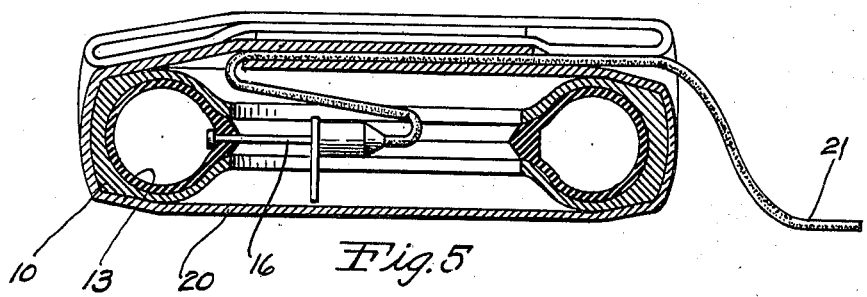
Fig. 5 is a cross-sectional view taken through the tire and blanket approximately on line 5—5 of Fig. 4.

It is to be understood that in the present vulcanizing method, as in any other, the factors of time, temperature, and pressure may be varied to suit different rubber compounds and, more particularly to accord with different sizes of tires to be cured or vulcanized. In any event, the tire is subjected to heat and pressure within the above described mold for a time sufficient to carry the vulcanizing process beyond the blow point of the compound, or, in other words, to "set" the cure. Thereafter, instead of completing the cure of the tire within the mold, it is removed and wrapped in a blanket 20 of appropriate insulating material. This blanket is made sufficiently large, as shown in Figs. 2 to 4, inclusive, so that it will completely enclose the tire and prevent the same from being chilled too quickly by the surrounding room atmosphere, and in such wrapped condition the tire is permitted to soak for the remainder of the cure. In effect, the blanket 20 serves as a fireless cooker within which the vulcanizing process is completed by the residual heat of the tire and airbag after the latter have been removed from the mold.

Numerous materials may be used in the formation of the blanket 20, as for example, sheet asbestos or wool. A very satisfactory blanket capable of withstanding hard service has been formed from inner and outer layers of closely woven fabric with an intermediate and relatively thick layer of felt. If desired the fabric in such a blanket may be coated with rubber or similar material to render the same substantially impervious to air. Obviously, materials other than those specifically mentioned may also be used and in this respect the invention is not limited.

As soon as the tire and airbag are removed from the mold at the end of the first stage of the present cure they are laid upon the blanket 20 substantially in the center thereof as shown in Fig. 2, and the opposite side edges of the blanket are folded into overlapping relation over the tire. At the same time, a short piece of flexible hose 21 is quickly applied to the inflation stem 16 of the airbag 13 and it is left projecting outwardly from the folded blanket 20 so that any steam or vapor that might otherwise have remained in the airbag 13 will be vented to the atmosphere, thus keeping the blanket dry and protecting it from injury. Then the opposite ends of the partly folded blanket are folded inwardly as shown in Fig. 4, whereupon the tire is completely enclosed. Heat will continue to flow from the airbag to the interior of the tire to complete the vulcanizing process.

As a result of using this new vulcanizing method, the individual molds need not be occupied by the tires for as much time as has heretofore been necessary, and therefore the production capacities of the molds are increased. The percentage of such increase will of course vary with different sizes of tires and will be dependent to some extent upon the type of cure practiced within the mold. By way of example, it is noted that reductions of approximately 20% in mold curing time have been effected in production of certain sizes of truck tires wherein the steam-air cure of my above mentioned Patent No. 2,066,265 has been used in the first stage of cure. As compared with mold equipment, the blankets 20 are relatively inexpensive, and they can easily be manipulated by the usual vulcanizer attendants without any substantial increase in labor cost per tire.

From the foregoing it will be evident that this new method of vulcanizing tires is especially applicable to the problems of manufacturers who are temporarily confronted with the necessity for increased production, such increase to be effected promptly and without the cost and delay incident to acquisition of new mold equipment. Obviously the invention is susceptible of modifications in details of the equipment and in the steps of the method, and it is intended that the appended claims shall define the various novel features.

I claim:

1. The method of vulcanizing tires which consists in partially vulcanizing a tire by application of heat and pressure within a mold, removing the hot tire from the hot mold, and enclosing the tire in an insulating body whereby to permit completion of the vulcanization by residual heat within the tire.

2. The method of vulcanizing tires which consists in partially vulcanizing a tire by application of heat and pressure within a mold, removing the tire from the mold while the tire is still hot, and immediately placing the tire within an insulating body whereby to permit completion of the vulcanization by residual heat within the tire.

3. The method of vulcanizing tires which consists in partially vulcanizing a tire by application of heat and pressure within a mold, removing the tire from the mold while the tire is still hot, and wrapping the tire in an insulating blanket to permit completion of the vulcanization by residual heat within the tire.

4. The method of vulcanizing tires which consists in partially vulcanizing a tire on an airbag by application of heat and pressure within a mold, removing the tire and the airbag from the mold while each is still hot, and enclosing the tire with the airbag still in place in an insulating body whereby to permit completion of the vulcanization by residual heat of the tire and airbag.

5. The method of vulcanizing tires which consists in partially vulcanizing a tire on an airbag by application of heat and pressure within a mold, removing the tire and the airbag from the mold while the tire and airbag are still hot, and wrapping the tire and airbag in an insulating blanket to permit completion of the vulcanization by residual heat of the tire and airbag.

6. The method of vulcanizing tires which consists in applying heat and pressure to a tire sufficient to partially vulcanize it beyond the blow point, and enclosing the tire while it is still hot in an insulating body whereby to permit completion of the vulcanization by residual heat of the tire.

7. The method of vulcanizing tires which consists in partially vulcanizing a tire on an airbag by application of heat and pressure within a mold, removing the tire and the airbag from the mold while they are still hot, and wrapping the tire and airbag in an insulating blanket to permit completion of the vulcanization by residual heat of the tire and airbag, and venting the interior of the airbag to the atmosphere outside of the blanket.

8. In the art of vulcanizing tires, the novel step of permitting a partly vulcanized tire while it is still hot to rest within an insulating enclosure whereby to finish the cure without application of any additional heat or pressure.

9. In the art of vulcanizing tires, the novel steps of starting the cure by application of heat in a mold, and finishing the cure while the tire is still hot within an insulating enclosure but without application of any additional heat.

10. In the art of vulcanizing tires, the novel step of wrapping a partly vulcanized tire while still hot in an insulating blanket whereby to complete the cure without application of any more heat.

11. The method of vulcanizing tires which consists in confining a tire within a closed mold, subjecting the confined tire to heat and pressure for a time sufficient to only partly vulcanize it, discontinuing the heat and pressure and removing the tire from the mold while the tire is still hot, and completing the vulcanization by action of the residual heat within the tire without applying any more heat.

12. The method of vulcanizing tires which consists in confining a tire on an airbag within a closed mold, subjecting the confined tire to internal heat and pressure for a time sufficient to only partly cure it beyond the blow point, discontinuing the heat and pressure and removing the tire and airbag from the mold, and immediately thereafter enclosing the tire and airbag while still hot in an insulating body to complete the cure by permitting the tire to remain so-enclosed without applying any more heat.

13. The method of vulcanizing tires which consists in confining a tire on an airbag within a closed mold, subjecting the confined tire to internal heat and pressure for a time sufficient to only partly cure it beyond the blow point, discontinuing the heat and pressure and removing the tire and airbag from the mold, and immediately thereafter enclosing the tire and airbag while still hot in an insulating body to complete the cure by permitting the tire to remain so-enclosed without applying any more heat, and venting the interior of the airbag to the atmosphere outside of said insulating body.

14. The method of vulcanizing pneumatic tires which consists in confining a tire on an airbag within a closed mold, inflating the airbag and subjecting the confined tire to heat both internally and externally for a time sufficient to only partly vulcanize it beyond the blow point, discontinuing the heat and removing the tire from the mold yet leaving the airbag in the tire while the tire and airbag are still hot, and completing the vulcanization by permitting the tire to absorb residual heat from the airbag without applying any more heat.

HAROLD A. FREEMAN.